Nov. 24, 1931.   C. C. FARMER   1,832,859
FLUID PRESSURE BRAKE
Filed Oct. 18, 1930   2 Sheets-Sheet 1
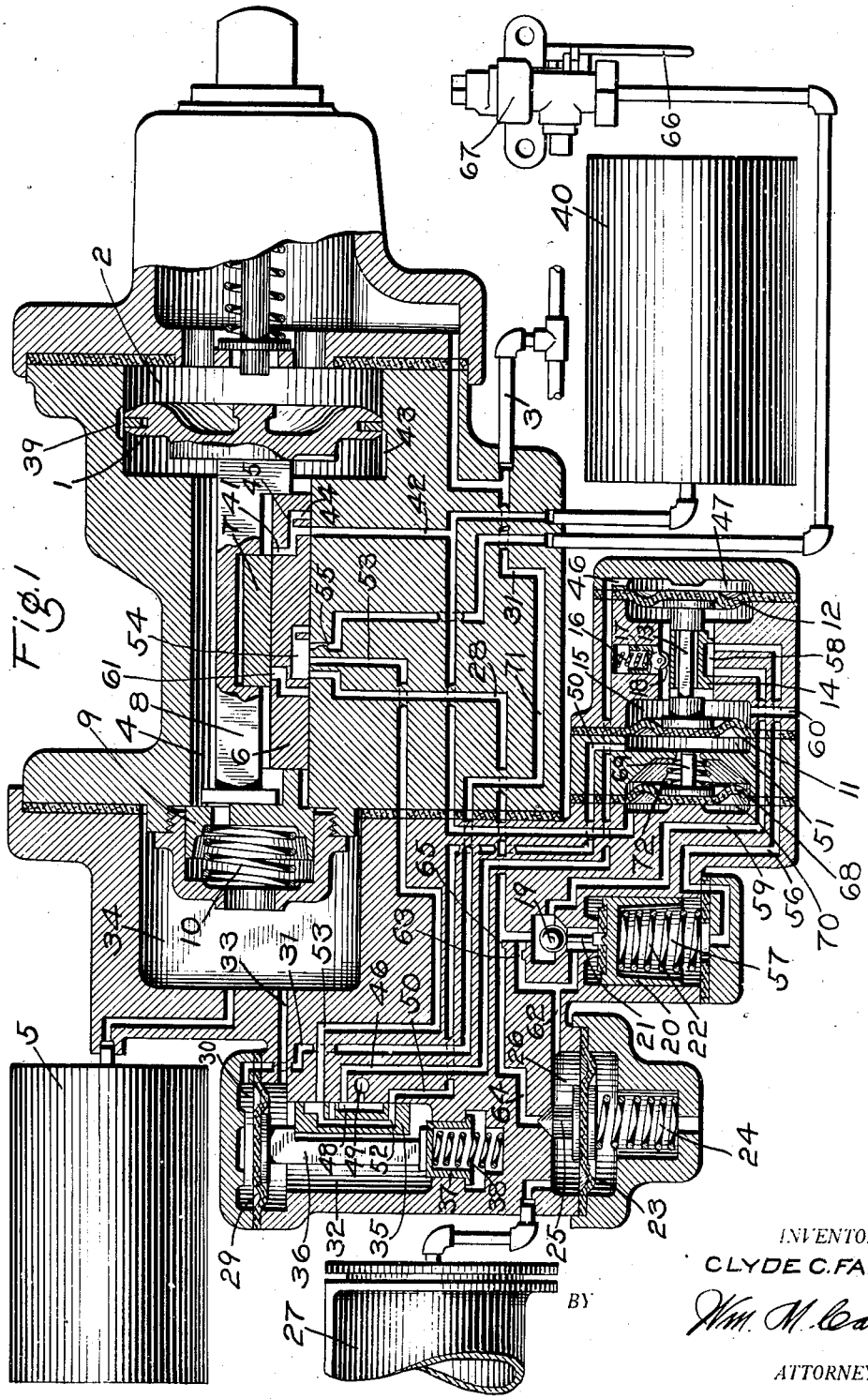
INVENTOR.
CLYDE C. FARMER
BY Wm. M. Cady
ATTORNEY.

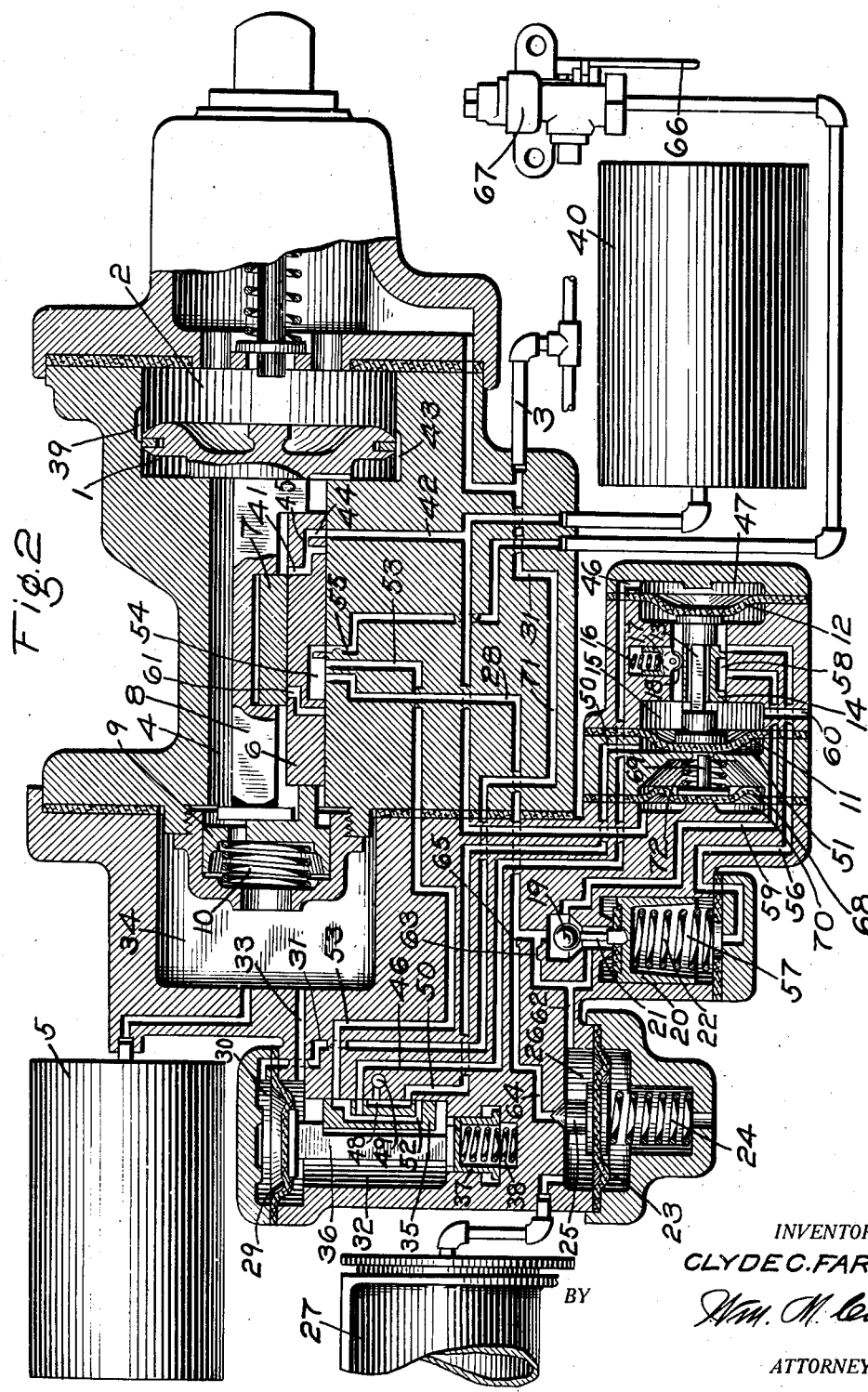

Patented Nov. 24, 1931

1,832,859

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 18, 1930. Serial No. 489,560.

This invention relates to fluid pressure brakes, and more particularly to an automatic fluid pressure brake system in which the brakes are applied by reducing the brake pipe pressure and are released when the brake pipe pressure is increased.

Particularly on long trains, there is danger that excessive and damaging shocks may be caused when the brakes are applied, due to the fact that the brakes are applied on cars at the head end of the train, before they are applied on the cars at the rear end of the train, so that the slack is permitted to run in harshly and thus cause shocks.

The principal object of my invention is to provide means for delaying the brake application on cars at the front end of the train, so that the brakes will be applied on the cars at the front end of the train more nearly in synchronism with the application of the brakes on the cars at the rear end of the train.

In the accompanying drawings; Fig. 1 is a diagrammatic sectional view of a brake controlling valve mechanism embodying my invention, and showing the triple valve device in normal release position; and Fig. 2 a view similar to Fig. 1, but showing the parts as positioned on cars at the head end of the train when the brake pipe pressure is increased to effect the release of the brakes.

The brake controlling valve mechanism includes a triple valve device comprising a piston 1 having the piston chamber 2 at one side connected to the usual brake pipe 3. The valve chamber 4 at the opposite side of the piston is connected to the usual auxiliary reservoir 5 and contains a main slide valve 6 and a graduating slide valve 7 adapted to be operated by piston 1 through piston stem 8.

The triple valve device shown is of the retarded release type, having a retarded release stop member 9 engaging the inner end of the stem 8 and subject to the pressure of a spring 10.

A selector valve device is provided comprising a pair of flexible diaphragms 11 and 12 connected by a stem 13 and adapted to operate a slide valve 14, mounted in the intermediate valve chamber 15. A spring 16 acts on a member 17 carrying a roller 18, so that said collar presses the valve 14 to its seat.

The selector valve device controls the cutting in and out of operation of a brake cylinder pressure inshot valve device comprising a ball valve 19 and a piston 20 having a stem 21 adapted to engage the valve. A spring 22 acts on piston 20 and urges the same upwardly so as to unseat the valve 19.

A hold-back valve device is provided comprising a flexible diaphragm 23 subject to the pressure of a spring 24 and carrying a valve 25. The chamber 26 at one side of the diaphragm is open to the brake cylinder 27, and the valve 25 controls communication from a passage 64, connected to passage 28, which leads to the seat of slide valve 6, to chamber 26 and the brake cylinder 27.

For controlling the operation of the selector valve device, a pilot valve device is provided comprising a flexible diaphragm 29 having the chamber 30 at one side connected by a passage 31 to the brake pipe 3, and having the valve chamber 32 at the opposite side connected, through a passage 33 with chamber 34 and the auxiliary reservoir 5. In chamber 32 is mounted a slide valve 35 adapted to be operated by diaphragm 29, through a stem 36. A spring stop 37 engages the lower end of the stem 36 and is subject to the pressure of a spring 38, so that downward movement of stem 36 from the normal position shown in the drawing, is opposed by the spring 38.

Assuming the triple valve parts in normal release position, as shown in Fig. 1, when the brake pipe is charged with fluid under pressure, fluid flows from the brake pipe 3 to piston chamber 2, and thence through a feed groove 39 around the piston 1 to valve chamber 4 and thence to chamber 34 and the auxiliary reservoir 5. The emergency reservoir 40 is charged in this position from valve chamber 4, through port 41 in slide valve 6 and passage 42.

In releasing the brakes after having effected an application of the brakes, the triple valve piston 1 may be moved either to the normal release position, as shown in Fig. 1, or to the inner retarded release position, as shown in Fig. 2, dependent upon the extent of the differential of pressures between the brake pipe and the auxiliary reservoir.

At the head end of the train, where the rate and degree of increase in brake pipe pressure is greatest, the triple valve pistons will move to the inner position, the main slide valve 6 and the member 9 being forced rearwardly against the resistance of spring 10. In this retarded release position, communication through the feed groove 39 is cut off and fluid under pressure is supplied from the brake pipe to the auxiliary reservoir through the feed groove 43. The emergency reservoir is charged in the retarded release position through a port 44 which leads to port 41 through a restricted port 45, so that the rate of recharge in the retarded release position is reduced.

The pilot valve device being subject to the opposing pressures of the brake pipe and the auxiliary reservoir, operates somewhat like the retarded release triple valve. On cars at the head end of the train, the rate of increase in brake pipe pressure in releasing the brakes is sufficient to cause the diaphragm 29 to be flexed downwardly against the resistance of spring 38, while on cars at the rear of the train, the differential created by the increase in brake pipe pressure is not sufficient to flex the diaphragm.

If the diaphragm 29 remains in the unflexed position, as shown in Fig. 1, the passage 46 leading to diaphragm chamber 47 of the selector valve device is connected, through cavity 48 in slide valve 35 with an atmospheric exhaust port 49. Passage 50, leading to diaphragm chamber 51, is connected through cavity 52 in slide valve 35 with a passage 53, leading to the seat of main slide valve 6. In the release position of slide valve 6, passage 53 opens to cavity 54, through which fluid under pressure is released from the brake cylinder by way of passage 28 and exhaust passage 55.

There will thus be a temporary supply of fluid under pressure from the brake cylinder to passage 53 and flowing to diaphragm chamber 51, the diaphragms 11 and 12 are shifted to the right, so that the valve 14 is shifted to the position shown in Fig. 1. In moving the valve 14 to the position shown in Fig. 1, the diaphragms 11 and 12 move to the right of the position shown in Fig. 1, but as the brake cylinder pressure supplied to the chamber 51 reduces to atmospheric pressure, the diaphragms return to the position shown in Fig. 1. Due, however, to the lost motion between the valve 14 and the diaphragms 11 and 12, the valve 14 remains in its right hand position, as shown in Fig. 1. In this position, passage 56, leading to chamber 57 at the spring side of piston 20 is connected, through cavity 58 in slide valve 14, with passage 59, so that the under face of the piston 20 is subjected to the pressure of fluid supplied to the brake cylinder through passage 28, by operation of the triple valve device. The piston 20 will thus be maintained in its upper position by spring 22, holding the valve 19 unseated, regardless of the degree of brake cylinder pressure.

On cars at the head end of the train, the rate of increase in brake pipe pressure is such that the diaphragm 29 is flexed downwardly, against the resistance of spring 38, so that the pilot valve parts assume the positions shown in Fig. 2.

In this position, passage 46 is connected, through cavity 52 in slide valve 35 with passage 53, so that in releasing the brakes, fluid from the brake cylinder is supplied to diaphragm chamber 47. Passage 50, leading to diaphragm chamber 51 is connected to exhaust port 49, through cavity 48. The diaphragms 11 and 12 are then flexed to the left, to the position shown in Fig. 2. In this position, passage 56 is uncovered by the movement of the slide valve 14, so that said passage is open to valve chamber 15. The valve chamber 15 is open to the atmosphere through port 60, so that the chamber 57 is now maintained at atmospheric pressure.

Before leaving a terminal, the brakes are always applied and then released, in order to test the condition of the brakes, so that upon leaving a terminal, the selector valves are automatically adjusted in the manner above described, with the selector valves on cars at the head end of the train adjusted to the position shown in Fig. 2, and with the selector valves on cars at the rear end of the train adjusted to the position shown in Fig. 1.

When an application of the brakes is effected by reducing the brake pipe pressure in the usual manner, the triple valve piston 1 is shifted to service position, in which movement, the graduating valve 7 just moves to uncover the service port 61, and then the main slide valve 6 is moved, so that the port 61 registers with passage 28. Fluid under pressure is then supplied from the auxiliary reservoir 5, through passage 28 to passage 62, having a restricted flow portion 63, to chamber 26 and also past the open valve 19 to passage 62 and chamber 26. From chamber 26, fluid is supplied to the brake cylinder 27.

So long as the valve 19 remains unseated, a relatively rapid rate of flow to the brake cylinder is obtained. On cars at the head end of the train, the selector valves being set to connect chamber 57 with the atmosphere, as hereinbefore described, when the brake cylinder pressure acting on the upper exposed area of the valve piston 20 is sufficient to overcome the opposing pressure of spring 22, the valve piston 20 will be shifted from its upper seat, exposing the full upper area of the valve piston to brake cylinder pressure.

The valve piston then quickly shifts to its lower seat, permitting the valve 19 to seat and cut off the further flow of fluid to the brake cylinder past the valve. Preferably the piston 20 is arranged to move when the brake cylinder pressure is just sufficient to cause the brake cylinder piston to move out and cause the brake shoes to engage the wheels.

Fluid under pressure continues to be supplied to the brake cylinder after the valve 19 closes, by way of the restricted portion 63 of passage 62, until the brake cylinder pressure in chamber 26 has been increased to a degree sufficient to overcome the opposing pressure of spring 24 on diaphragm 23. Said diaphragm is then flexed downwardly, so that the valve 25 is unseated. Fluid under pressure will now be supplied to the brake cylinder by way of passage 64, having a restricted flow portion 65.

It will thus be seen that on cars at the head end of the train, there is an initial inshot of fluid under pressure to the brake cylinder, just sufficient to ensure the outward movement of the brake cylinder piston, and then a slow build up of brake cylinder pressure by way of the choke 63, for a time sufficient to permit the brakes to be applied on cars at the rear end of the train, and finally, after the brakes have been applied on cars at the rear of the train, the valve 25 is unseated, to permit a more rapid build up of brake cylinder pressure on cars at the front end of the train.

On cars at the rear end of the train, where the selector valves are set to the position shown in Fig. 1, fluid under pressure as supplied to the brake cylinder is also supplied through passage 56 to chamber 57, so that the opposing fluid pressures on the valve piston 20 remain equalized, permitting the spring 22 to maintain the valve piston 20 at its upper seat, holding the valve 19 unseated, throughout the brake application.

As a result, on cars at the rear end of the train, the brake cylinder pressure can build up at a more rapid rate than on cars at the front end of the train.

When the brake pipe pressure is reduced to effect an application of the brakes, the diaphragm 29 will be flexed upwardly from the position shown in Fig. 1, so that the slide valve 35 on cars at the head end of the train will be shifted from the position shown in Fig. 2 to the position shown in Fig. 1, but this will have no effect on the selector valve devices which have been previously set to the position shown in Fig. 2, if no pressure is being retained in the brake cylinder. In this connection, it may be stated that the pilot valve device is more sensitive to movement than the triple valve device and consequently, the pilot valve device will move to its upper position, when the brake pipe pressure is reduced to effect an application of the brakes, before the triple valve parts move to service position. But since no pressure is retained in the brake cylinder, there will be no fluid under pressure in passage 53, when the slide valve 35 is moved to its upper position, and consequently, no fluid pressure will be supplied through cavity 52 and passage 50 to diaphragm chamber 51. As a consequence, on cars at the head end of the train, where the selector valve device is in the position shown in Fig. 2, the selector valve will remain in that position, provided pressure is not being retained in the brake cylinder.

When the brake pipe pressure is increased to effect the release of the brakes, the pilot valve devices are operated in the manner hereinbefore described, to adjust the selector valve devices to positions, dependent upon whether the selector valve device is located at the head or the rear of the train.

By employing a pilot valve device for controlling the adjustment of the selector valve device, which operates independently of the triple valve device, adjustment may be made as desired, whereby a greater or a lesser number of cars at the head end of the train may be caused to assume the position shown in Fig. 1, by merely changing the resistance of the spring 38, so that a greater or lesser differential of pressures is required to cause the diaphragm 29 to be flexed downwardly.

In controlling a train after starting on a descending grade, it is not necessary or desirable to retard the rate of build up of brake cylinder pressure on cars at the front end of the train and consequently, means are provided for setting the selector valve devices on all cars, so that the inshot valve devices are all cut out of action throughout the train.

For this purpose, the pressure of fluid retained in the brake cylinder when the handle 66 of the retaining valve device 67 is turned to the position for retaining fluid under pressure in the brake cylinder, is utilized to cause movement of the selector valve device to the position for cutting the inshot valve device out of action.

When pressure is retained in the brake cylinder, upon a subsequent reduction in brake pipe pressure after a release of the brakes, the pilot valve device will be moved to its upper position, before the triple valve parts move to service position, as hereinbefore explained. Since fluid under pressure was retained in the brake cylinder at the previous application of the brakes, when slide valve 35 of the pilot valve device is moved to its upper position, as shown in Fig. 1, fluid under pressure is supplied from the brake cylinder through passage 53, cavity 52 and passage 50 to diaphragm chamber 51, so that the selector valve device is shifted to the position shown in Fig. 1, in cases where the selector valve is in the position shown in Fig. 2. As a result, when the retaining valve device 67 is set to retain pressure in the brake cylinder, all the selector valve devices throughout the train are set to the position shown in Fig. 1, in which the supply of fluid to the brake cylinder is not held back, since the inshot piston 20 remains in the position shown in Fig. 1.

In high speed service, it is not considered necessary to retard the build up of brake cylinder pressure on cars at the head end of the train, in order to avoid shocks, and to prevent this action, I utilize the condition that in high speed service a standard brake pipe pressure of ninety pounds is employed, whereas in low speed service, a lower standard brake pipe pressure is employed, such as seventy pounds.

For this purpose, an additional diaphragm 68 is provided, which is adapted to actuate a stem 69. The stem 69 is in axial alinement with the diaphragm 11 and is operable by the diaphragm 68 to engage and shift the diaphragm 11 to its right hand position. The chamber 70 at one side of the diaphragm 68 is connected, through passage 71 with the emergency reservoir 40. A coil spring 72 acts on diaphragm 68 in opposition to the fluid pressure in chamber 70. The spring 72 is such that a fluid pressure in chamber 70 at or less than the standard pressure carried in low speed service, such as seventy pounds, will not be sufficient to overcome the pressure of the spring, but when the pressure in said chamber substantially exceeds seventy pounds, as is the case in high speed service, then the fluid pressure in chamber 70 will overcome the spring pressure and will then cause the movement of the diaphragm 68 and the stem 69 to the right, so that if the diaphragm 11 should be in its left hand position, it will be shifted to the right hand position. Furthermore, the selector valve device will be prevented from moving to the left by the engagement of the stem 69 on the diaphragm 11, so long as the brake pipe pressure is maintained at the high speed pressure.

The chamber 70 is charged with the pressure in the emergency reservoir 40, which, being charged at the pressure carried in the brake pipe, corresponds with the brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, brake cylinder, and a brake controlling valve device operated upon a reduction in brake pipe pressure for supplying fluid under pressure to the brake cylinder to effect an application of the brakes, of valve means operative in effecting an application of the brakes for delaying the build up of pressure in the brake cylinder, and a valve device separate from said controlling valve device and operated upon a predetermined rate of increase in brake pipe pressure for effecting the operation of said valve means.

2. In a fluid pressure brake, the combination with a brake pipe, brake cylinder, and a brake controlling valve device operated upon a reduction in brake pipe pressure for supplying fluid under pressure to the brake cylinder to effect an application of the brakes, of valve means operative in effecting an application of the brakes for delaying the build up of pressure in the brake cylinder, and a valve device operatively independent of said brake controlling valve device and operating upon a predetermined rate of increase in brake pipe pressure for effecting the operation of said valve means to delay the build up of brake cylinder pressure.

3. In a fluid pressure brake, the combination with a brake pipe, brake cylinder, and a brake controlling valve device operated upon a reduction in brake pipe pressure for supplying fluid under pressure to the brake cylinder to effect an application of the brakes, of valve means operative in effecting an application of the brakes for delaying the build up of pressure in the brake cylinder, and a pilot valve device operated upon a certain rate of increase in brake pipe pressure for effecting the operation of said valve means to delay the build up of brake cylinder pressure.

4. In a fluid pressure brake, the combination with a brake pipe, brake cylinder, auxiliary reservoir, and a triple valve device subject to the opposing pressures of the brake pipe and the auxiliary reservoir and operated upon a reduction in brake pipe pressure for supplying fluid under pressure to the brake cylinder to effect an application of the brakes, of valve means operative in effecting an application of the brakes for delaying the build up of pressure in the brake cylinder, and a pilot valve device operated upon a predetermined increase in brake pipe pressure for effecting the operation of said valve means to delay the build up of brake cylinder pressure, said pilot valve device comprising a movable abutment subject to the opposing pressures of the brake pipe and auxiliary reservoir, and a valve operated by said abutment for varying the fluid pressure on said valve means.

5. In a fluid pressure brake, the combination with a brake pipe, brake cylinder, auxiliary reservoir, and a triple valve device subject to the opposing pressures of the brake pipe and the auxiliary reservoir and operated upon a reduction in brake pipe pressure for supplying fluid under pressure to the brake cylinder to effect an application of the brakes, of valve means operative in effecting an application of the brakes for delaying the build up of pressure in the brake cylinder, and a pilot valve device operated upon a predetermined increase in brake pipe pressure for effecting the operation of said valve means to delay the build up of brake cylinder pressure, said pilot valve device comprising a spring, a movable abutment subject on one side to brake pipe pressure and on the opposite side to auxiliary reservoir pressure and the pressure of said spring, and a valve operative by said abutment for varying the fluid pressure on said valve means.

6. In a fluid pressure brake, the combination with a brake pipe, brake cylinder, and a brake controlling valve device operated upon a reduction in brake pipe pressure for supplying fluid under pressure to the brake cylinder to effect an application of the brakes, of valve means operative in effecting an application of the brakes for delaying the build up of pressure in the brake cylinder, said valve means being operated by fluid under pressure supplied from the brake cylinder, and a valve device operated upon a predetermined increase in brake pipe pressure for controlling communication through which fluid from the brake cylinder is supplied to said valve means.

7. In a fluid pressure brake, the combination with a brake pipe, brake cylinder, and a brake controlling valve device operated upon a reduction in brake pipe pressure for supplying fluid under pressure to the brake cylinder to effect an application of the brakes, of valve means operative in effecting an application of the brakes for delaying the build up of pressure in the brake cylinder, said valve means being operated by fluid under pressure supplied from the brake cylinder, and a valve device operated upon a predetermined increase in brake pipe pressure for controlling communication through which fluid from the brake cylinder is supplied to said valve means, said communication through which fluid is supplied from the brake cylinder to said valve means being also controlled by said brake controlling valve device.

8. In a fluid pressure brake, the combination with a brake pipe, brake cylinder, and a brake controlling valve device operated upon a reduction in brake pipe pressure for supplying fluid under pressure to the brake cylinder, of means for retarding the rate of build up of brake cylinder pressure in applying the brakes, valve means operative to cut said retarding means into and out of action, a pilot valve device for controlling the operation of said valve means, and means for retaining fluid under pressure in the brake cylinder in releasing the brakes, said pilot valve device being operated upon a reduction in brake pipe pressure and when pressure is retained in the brake cylinder to effect the operation of said valve means so as to cut said retarding means out of action.

9. In a fluid pressure brake, the combination with a brake pipe, brake cylinder, and a brake controlling valve device operated upon a reduction in brake pipe pressure for supplying fluid under pressure to the brake cylinder, of means for retarding the rate of build up of brake cylinder pressure in applying the brakes, a selector valve device operated by fluid under pressure from the brake cylinder for cutting said retarding means into and out of action, a pilot valve device for controlling the supply of fluid from the brake cylinder to said selector valve device, means operative to retain fluid under pressure in the brake cylinder in releasing the brakes, said pilot valve device being operated upon a reduction in brake pipe pressure to supply fluid under pressure retained in the brake cylinder to said selector valve device so as to operate said selector valve device to cut the retarding means out of action.

10. In a fluid pressure brake, the combination with a brake pipe, brake cylinder, and a triple valve device operated upon a reduction in brake pipe pressure for supplying fluid under pressure to the brake cylinder to effect an application of the brakes, of a valve mechanism operative to retard the rate of build up of pressure in the brake cylinder, a selector valve device operated by variations in fluid pressure for controlling the operation of said valve mechanism and having one position for cutting said valve mechanism into action and another position for cutting said valve mechanism out of action, and a pilot valve device for varying the fluid pressure on said selector valve device, said pilot valve device being operated by a rapid rate of increase in brake pipe pressure for effecting the movement of said selector valve device to its cut-in position, by a less rapid rate of increase in brake pipe pressure for effecting the movement of said selector valve device to its cut-out position, and by a reduction in brake pipe pressure to the position for effecting the movement of said selector valve device to its cut-out position.

In testimony whereof I have hereunto set my hand, this 16th day of October, 1930.

CLYDE C. FARMER.